(12) United States Patent
Guduru et al.

(10) Patent No.: US 12,666,376 B2
(45) Date of Patent: Jun. 23, 2026

(54) METHOD AND SYSTEM FOR NETWORK SLICE-SPECIFIC PROPAGATION DELAY COMPENSATION

(71) Applicant: Verizon Patent and Licensing Inc., Basking Ridge, NJ (US)

(72) Inventors: Vijayakrishna P. Guduru, Denville, NJ (US); Sudhakar Reddy Patil, Flower Mound, TX (US); Anthony Clay Reynolds, Rhome, TX (US); Raquel Morera Sempere, Weehawken, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 738 days.

(21) Appl. No.: 17/842,994

(22) Filed: Jun. 17, 2022

(65) Prior Publication Data

US 2023/0413202 A1     Dec. 21, 2023

(51) Int. Cl.
*H04W 56/00* (2009.01)
*H04W 28/02* (2009.01)

(52) U.S. Cl.
CPC ..... *H04W 56/004* (2013.01); *H04W 28/0268* (2013.01)

(58) Field of Classification Search
CPC ........... H04W 28/0268; H04W 56/004; H04W 56/0045
See application file for complete search history.

(56) References Cited

U.S. PATENT DOCUMENTS

| 2005/0286416 A1 * | 12/2005 | Shimonishi | ........... H04L 47/283 370/229 |
| 2021/0243641 A1 * | 8/2021 | Gangakhedkar | ........ H04L 67/12 |
| 2022/0240205 A1 * | 7/2022 | Chien | ................ H04W 56/0055 |
| 2023/0171725 A1 * | 6/2023 | Singh | ................ H04W 56/0045 370/350 |

(Continued)

FOREIGN PATENT DOCUMENTS

| WO | WO-2014010919 A1 * | 1/2014 | ............ H04W 48/02 |
| WO | WO-2018144936 A1 * | 8/2018 | ............ H04W 52/50 |

(Continued)

OTHER PUBLICATIONS

"Secure Federated Learning in 5G Mobile Network," Martin Isaksson and Karl Norrman, Dec. 7-11, 2020, IEEE Golbecom, 2020 (Year: 2020).*

*Primary Examiner* — Kevin T Bates
*Assistant Examiner* — Jaeyoung Kwak

(57) ABSTRACT

A method, a network device, and a non-transitory computer-readable storage medium are described in relation to an propagation delay compensation service. The propagation delay compensation service may calculate or select propagation delay compensation method and configuration data based on a time synchronization error budget value, which may be calculated based on quality of service information associated with a network slice, network slice information, and time sensitive communication assistance information. The propagation delay compensation service may calculate or select the propagation delay compensation method and configuration data based on other context information.

20 Claims, 7 Drawing Sheets

(56)     References Cited

U.S. PATENT DOCUMENTS

2023/0239816 A1 * 7/2023 Moon ................. H04W 56/001
                                                370/350
2023/0247417 A1 * 8/2023 Shin ...................... H04W 8/24
                                                455/422.1
2023/0276294 A1 * 8/2023 Kahn ............... H04W 28/0236
                                                370/230
2024/0323088 A1 * 9/2024 Bush .................. H04L 41/0895

FOREIGN PATENT DOCUMENTS

WO       WO-2021181363  A1 *  9/2021   ........ H04W 56/0065
WO       WO-2022084483  A1 *  4/2022
WO       WO-2022233912  A1 *  11/2022  .......... H04W 56/001
WO       WO-2022248035  A1 *  12/2022
WO       WO-2023014801  A1 *  2/2023   .......... H04W 72/512

* cited by examiner

300

COMMUNICATION INTERFACE 325

PROCESSOR 310

INPUT 330

305

MEMORY/STORAGE 315

SOFTWARE 320

OUTPUT 335

400

RECEIVES NETWORK SLICE INFORMATION
405

RECEIVES TIME SENSITIVE NETWORK ASSISTANCE INFORMATION (TSNAI)
410

SELECTS PDC METHOD BASED ON NETWORK SLICE INFORMATION AND TSNAI
415

GENERATES PDC CONFIGURATION BASED ON NETWORK SLICE INFORMATION AND TSNAI
420

TRANSMITS PDC SELECTION AND PDC CONFIGURATION TO END DEVICE
425

500

RECEIVES NETWORK SLICE INFORMATION, WHICH INCLUDES QOS INFORMATION
505

GENERATES A TIME SYNCHRONIZATION ERROR BUDGET BASED ON THE NETWORK SLICE INFORMATION
510

GENERATES TIME SENSITIVE NETWORK ASSISTANCE INFORMATION (TSNAI)
515

TRANSMITS THE TSNAI AND THE TIME SYNCHRONIZATION ERROR BUDGET
520

600

RECEIVES TIME SENSITIVE NETWORK ASSISTANCE INFORMATION (TSNAI) AND A TIME SYNCHRONIZATION ERROR BUDGET CALCULATED BASED ON NETWORK SLICE/QOS INFORMATION
605

GENERATES A MESSAGE THAT INCLUDES AT LEAST A PORTION OF THE TSNAI AND THE TIME SYNCHRONIZATION ERROR BUDGET
610

TRANSMITS THE MESSAGE TO A RAN DEVICE
615

METHOD AND SYSTEM FOR NETWORK SLICE-SPECIFIC PROPAGATION DELAY COMPENSATION

BACKGROUND

Development and design of networks present certain challenges from a network-side perspective and an end device perspective. For example, Next Generation (NG) wireless networks, such as Fifth Generation New Radio (5G NR) networks are being deployed and under development.

DETAILED DESCRIPTION

Figure 1:
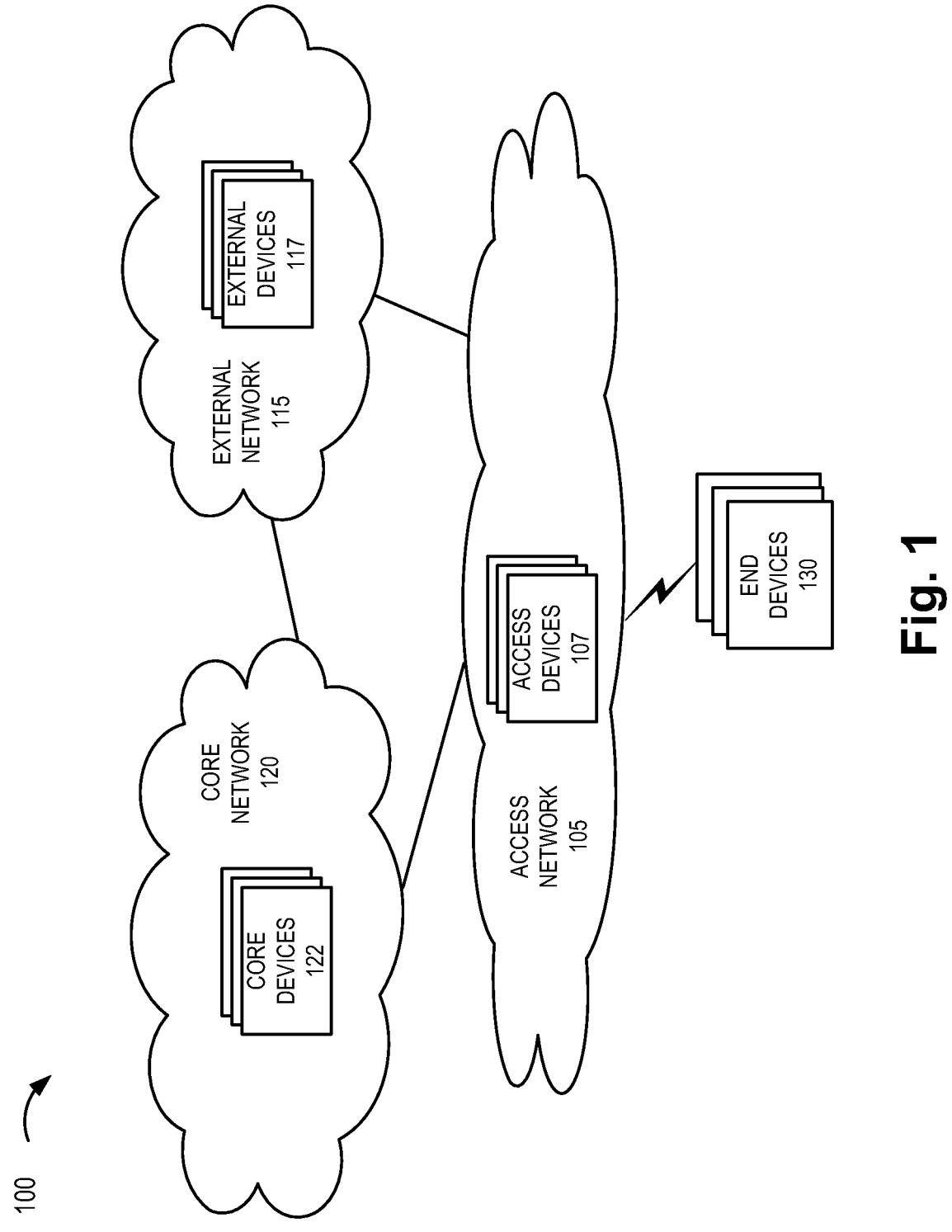
FIG. 1 is a diagram illustrating an exemplary environment in which an exemplary embodiment of a propagation delay compensation service may be implemented.

The following detailed description refers to the accompanying drawings. The same reference numbers in different drawings may identify the same or similar elements. Also, the following detailed description does not limit the invention.

Accurate time synchronization is provided for certain time-sensitive network (TSN) use cases and other types of application sessions in a wireless network. For example, various types of applications and/or services that may have ultra-low latency requirements and/or other type of quality of service (QoS) requirements may need accurate time synchronization between an end device and the network. A 5G radio access network (RAN) device, such as a next generation Node B (gNB), may select a propagation delay compensation (PDC) method, such as a timing advance (TA) method or a multi-round-trip-time (Multi-RTT) method, and a PDC configuration based on information received from a Time Sensitive Communication and Time Sensitive Function (TSCTSF). However, the selection and configuration of the PDC method are not mapped or defined for a network slice. For example, the PDC configuration may not account for quality of service (QoS), service level agreement (SLA), and/or another type of performance metric associated with the network slice. For example, the network slice may relate to an ultra-reliable low latency communication (URLLC) network slice or another type of network slice (e.g., a TSN slice) that may be time sensitive as well as applications and/or services provided via the network slice.

According to exemplary embodiments, a propagation delay compensation service is described. According to an exemplary embodiment, the propagation delay compensation service may include generating a time synchronization error budget based on a 5G QoS identifier (5QI) and correlated QoS characteristics/information associated with a network slice of relevance, as described herein. For example, a TSCTSF may generate the time synchronization error budget along with other types of TSC assistance information (TSCAI), as described herein. According to an exemplary embodiment, the propagation delay compensation service may provide 5QI/QoS information and the TSCAI, which may include the time synchronization error budget, to an RAN device, as described herein. For example, an SMF may provide such information to a gNB as a part of a packet data unit (PDU) session establishment procedure associated with an end device.

According to an exemplary embodiment, the propagation delay compensation service may include generating a PDC selection and a PDC configuration based on the 5QI/QoS information, and the time synchronization error budget. According to an exemplary embodiment, the PDC selection and the PDC configuration may be generated based on other information, such as a user equipment (UE) Power Class of the end device, access barring parameters pertaining to the end device, single network slice selection assistance information (S-NSSAI), and/or other types of criteria information (e.g., a threshold value, UE group/identity, part of day, congestion information, etc.), as described herein. For example, a gNB or another type of RAN device may select the PDC method (e.g., TA or Multi-RTT) and its configuration, and provide this information to the end device.

In view of the foregoing, the propagation delay compensation service may provide selection and configuration of a PDC method that may be network slice specific and account for various applications and/or services. The propagation delay compensation service may provide a selection and/or configuration of the PDC method which may yield more accurate time synchronization. The selected slice specific PDC method may overwrite a default PDC method that has been pre-configured in the end device (e.g., UE) and a RAN device (e.g., gNB), for example.

FIG. 1 is a diagram illustrating an exemplary environment 100 in which an exemplary embodiment of propagation delay compensation service may be implemented. As illustrated, environment 100 includes an access network 105, an external network 115, and a core network 120. Access network 105 includes access devices 107 (also referred to individually or generally as access device 107). External network 115 includes external devices 117 (also referred to individually or generally as external device 117). Core network 120 includes core devices 122 (also referred to individually or generally as core device 122). Environment 100 further includes end devices 130 (also referred to individually or generally as end device 130).

The number, type, and arrangement of networks illustrated in environment 100 are exemplary. For example, according to other exemplary embodiments, environment 100 may include fewer networks, additional networks, and/or different networks. For example, according to other exemplary embodiments, other networks not illustrated in FIG. 1 may be included, such as an X-haul network (e.g., backhaul, mid-haul, fronthaul, etc.), a transport network (e.g., Signaling System No. 7 (SS7), etc.), or another type of network that may support a wireless service and/or an application service, as described herein.

According to an exemplary embodiment, environment 100 may include a TSN system. For example, the TSN system may include TSN translators (TT), such as device-side (DS)-TTs and network side (NW)-TTs, clocks (e.g., grandmaster (GM), boundary, and slave), use of a protocol (e.g., Precision Time Protocol (PTP) or the like) and PTP messaging, among other components. According to an exemplary embodiment, the TSN may be implemented in a system (5GS). According to another exemplary embodiment, the TSN may be implemented in a network other than a 5GS.

A network device, a network element, or a network function (referred to herein simply as a network device) may be implemented according to one or multiple network architectures, such as a client device, a server device, a peer device, a proxy device, a cloud device, and/or a virtualized network device. Additionally, a network device may be implemented according to various computing architectures, such as centralized, distributed, cloud (e.g., elastic, public, private, etc.), edge, fog, and/or another type of computing architecture, and may be incorporated into distinct types of network architectures (e.g., Software Defined Networking (SDN), virtual, logical, network slice, etc.). The number, the type, and the arrangement of network devices are exemplary.

Environment 100 includes communication links between the networks and between the network devices. Environment 100 may be implemented to include wired, optical, and/or wireless communication links. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number, type, and arrangement of communication links illustrated in environment 100 are exemplary.

Environment 100 may include various planes of communication including, for example, a control plane, a user plane, a service plane, and/or a network management plane. Environment 100 may include other types of planes of communication. A message communicated in support of the propagation delay compensation service may use at least one of these planes of communication. Additionally, an interface of a network device may be modified (e.g., relative to an interface defined by a standards body, such as Third Generation Partnership Project (3GPP), 3GPP2, International Telecommunication Union (ITU), European Telecommunications Standards Institute (ETSI), GSM Association (GSMA), and the like) or a new interface of the network device may be provided in order to support the communication (e.g., transmission and reception of messages, an information element (IE), an attribute value pair (AVP), an object, a header, a parameter, or another form of a data instance) between network devices and the propagation delay compensation service logic of the network device. According to various exemplary implementations, the interface of the network device may be a service-based interface, a reference point-based interface, an Open Radio Access Network (O-RAN) interface, a 5G interface, another generation of interface (e.g., 5.5G, Sixth Generation (6G), Seventh Generation (7G), etc.), or some other type of network interface.

Access network 105 may include one or multiple networks of one or multiple types and technologies. For example, access network 105 may be implemented to include a 5G RAN, a future generation RAN (e.g., a 6G RAN, a 7G RAN, or a subsequent generation RAN), a centralized-RAN (C-RAN), an O-RAN, and/or another type of access network. Access network 105 may include a legacy RAN (e.g., a Third Generation (3G) RAN, a Fourth Generation (4G) or 4.5 RAN, etc.). Access network 105 may communicate with and/or include other types of access networks, such as, for example, a Wi-Fi network, a Worldwide Interoperability for Microwave Access (WiMAX) network, a local area network (LAN), a Citizens Broadband Radio System (CBRS) network, a cloud RAN, an O-RAN network, a virtualized RAN (vRAN), a self-organizing network (SON), a wired network (e.g., optical, cable, etc.), or another type of network that provides access to or can be used as an on-ramp to access network 105.

Depending on the implementation, access network 105 may include one or multiple types of network devices, such as access devices 107. For example, access device 107 may include a gNB, an evolved Long Term Evolution (eLTE) evolved Node B (eNB), an eNB, a radio network controller (RNC), a remote radio head (RRH), a baseband unit (BBU), a radio unit (RU), a remote radio unit (RRU), a centralized unit (CU), a CU-control plane (CP), a CU-user plane (UP), a distributed unit (DU), a small cell node (e.g., a picocell device, a femtocell device, a microcell device, a home eNB, etc.), an open network device (e.g., O-RAN Centralized Unit (O-CU), O-RAN Distributed Unit (O-DU), O-RAN next generation Node B (O-gNB), O-RAN evolved Node B (O-eNB)), a 5G ultra-wide band (UWB) node, a future generation wireless access device (e.g., a 6G wireless station, a 7G wireless station, or another generation of wireless station), another type of wireless node (e.g., a WiFi device, a WiMax device, a hotspot device, etc.) that provides a wireless access service, or another type of network device that provides a transport service (e.g., routing and forwarding), such as a router, a switch, or another type of layer 3 (e.g., network layer of the Open Systems Interconnection (OSI) model) network device.

According to an exemplary embodiment, at least some of access devices 107 include logic of the propagation delay compensation service, as described herein. For example, access device 107 may select a propagation delay compensation method (e.g., TA or Multi-RTT) and configuration based on time sensitive communication assistance information (TSCAI), 5G QoS identifier (5QI) and correlated QoS characteristics/information, as described herein. Access device 107 may select the propagation delay compensation method and configuration (e.g., parameters) based on other types of information, such as S-NSSAI, ability to support Time Sensitive Networking, UE Power Class, access barring information, and/or other types of criteria information (e.g., a threshold value, UE group, IMEI of UE, IMEISVN of UE, part of day, current and/or prospective congestion level, etc.), as described herein.

External network 115 may include one or multiple networks of one or multiple types and technologies that provides an application service. For example, external network 115 may be implemented using one or multiple technologies including, for example, network function virtualization (NFV), software defined networking (SDN), cloud computing, Infrastructure-as-a-Service (IaaS), Platform-as-a-Service (PaaS), Software-as-a-Service (SaaS), or another type of network technology. External network 115 may be implemented to include a cloud network, a private network, a public network, a MEC network, a fog network, the Internet, a packet data network (PDN), a service provider network, the World Wide Web (WWW), an Internet Protocol Multimedia Subsystem (IMS) network, a Rich Communication Service (RCS) network, a software-defined (SD) network, a virtual network, a packet-switched network, a data center, or other type of network that may provide access to and may host an end device application service.

Depending on the implementation, external network 115 may include various network devices such as external devices 117. For example, external devices 117 may include virtual network devices (e.g., virtualized network functions (VNFs), servers, host devices, application functions (AFs), application servers (ASs), server capability servers (SCSs), containers, hypervisors, virtual machines (VMs), network function virtualization infrastructure (NFVI), and/or other types of virtualization elements, layers, hardware resources, operating systems, engines, etc.) that may be associated with application services for use by end devices (not illustrated). By way of further example, external devices 117 may include mass storage devices, data center devices, NFV devices, SDN devices, cloud computing devices, platforms, and other types of network devices pertaining to various network-related functions (e.g., security, management, charging, billing, authentication, authorization, policy enforcement, development, etc.). Although not illustrated, external network 115 may include one or multiple types of core devices 122, as described herein.

External devices 117 may host one or multiple types of application services. For example, the application services may pertain to broadband services in dense areas (e.g., pervasive video, smart office, operator cloud services, video/photo sharing, etc.), broadband access everywhere (e.g., 50/100 Mbps, ultra-low-cost network, etc.), enhanced mobile broadband (eMBB), higher user mobility (e.g., high speed train, remote computing, moving hot spots, etc.), Internet of Things (e.g., smart wearables, sensors, mobile video surveillance, smart cities, connected home, etc.), extreme real-time communications (e.g., tactile Internet, augmented reality (AR), virtual reality (VR), etc.), lifeline communications (e.g., natural disaster, emergency response, etc.), ultra-reliable communications (e.g., automated traffic control and driving, collaborative robots, health-related services (e.g., monitoring, remote surgery, etc.), drone delivery, public safety, etc.), broadcast-like services, communication services (e.g., email, text (e.g., Short Messaging Service (SMS), Multimedia Messaging Service (MMS), etc.), massive machine-type communications (mMTC), voice, conferencing, instant messaging), video streaming, and/or other types of wireless and/or wired application services. External devices 117 may also include other types of network devices that support the operation of external network 115 and the provisioning of application services, such as an orchestrator, an edge manager, an operations support system (OSS), a local domain name system (DNS), registries, and/or external devices 117 that may pertain to various network-related functions (e.g., security, management, charging, billing, authentication, authorization, policy enforcement, development, etc.). External devices 117 may include non-virtual, logical, and/or physical network devices.

Core network 120 may include one or multiple networks of one or multiple network types and technologies. Core network 120 may include a complementary network of access network 105. For example, core network 120 may be implemented to include a 5G core network, an evolved packet core (EPC) of an LTE network, an LTE-Advanced (LTE-A) network, and/or an LTE-A Pro network, a future generation core network (e.g., a 5.5G, a 6G, a 7G, or another generation of core network), and/or another type of core network.

Depending on the implementation of core network 120, core network 120 may include diverse types of network devices that are illustrated in FIG. 1 as core devices 122. For example, core devices 122 may include a user plane function (UPF) (which may include a NW-TT), a Non-3GPP Interworking Function (N3IWF), an access and mobility management function (AMF), a session management function (SMF), a unified data management (UDM) device, a unified data repository (UDR), an authentication server function (AUSF), a network slice selection function (NSSF), a network repository function (NRF), a policy control function (PCF), a network data analytics function (NWDAF), a network exposure function (NEF), a service capability exposure function (SCEF), a lifecycle management (LCM) device, a TSCTSF, a mobility management entity (MME), a packet data network gateway (PGW), an enhanced packet data gateway (ePDG), a serving gateway (SGW), a home agent (HA), a General Packet Radio Service (GPRS) support node (GGSN), a home subscriber server (HSS), an authentication, authorization, and accounting (AAA) server, a policy and charging rules function (PCRF), a policy and charging enforcement function (PCEF), and/or a charging system (CS).

According to other exemplary implementations, core devices 122 may include additional, different, and/or fewer network devices than those described. For example, core devices 122 may include a non-standard or a proprietary network device, and/or another type of network device that may be well-known but not particularly mentioned herein. Core devices 122 may also include a network device that provides a multi-RAT functionality (e.g., 4G and 5G, 5G and 5.5G, 5G and 6G, etc.), such as an SMF with PGW control plane functionality (e.g., SMF+PGW-C), a UPF with PGW user plane functionality (e.g., UPF+PGW-U), and/or other combined nodes (e.g., an HSS with a UDM and/or UDR, an MME with an AMF, etc.). Also, core devices 122 may include a split core device 122. For example, core devices 122 may include a session management (SM) PCF, an access management (AM) PCF, a user equipment (UE) PCF, and/or another type of split architecture associated with another core device 122, as described herein.

According to an exemplary embodiment, at least some of core devices 122 may include logic of the propagation delay compensation service, as described herein. For example, a TSCTSF may include logic of the propagation delay compensation service, which may support accurate time synchronization. The TSCTSF may generate a time synchronization error budget (also known as a Uu time synchronization error budget) that relates to the error budget available for access network 105 to provide access stratum time to end device 130. The TSCTSF may generate the time synchronization error budget based on a 5QI (and potentially one or more instances of correlated QoS information with a 5QI value) associated with a network slice (e.g., S-NSSAI) and end device 130 of relevance. The TSCTSF may generate the time synchronization error budget based on other information, such as a time synchronization error budget provided by an AF (directly or via a NEF), whether a 5GS or a clock connected to DS-TT/NW-TT acts as the grandmaster clock, PTP port states, and so forth.

Additionally, for example, an SMF may include logic of the propagation delay compensation service. For example, the SMF may send TSCAI, which may include the time synchronization error budget, and 5QI/QoS information to access device 107, as described herein. This may be performed as a part of a PDU establishment procedure associated with end device 130 and external device 117.

End device 130 includes a device that may have communication capabilities (e.g., wireless, wired, optical, etc.). End device 130 may or may not have computational capabilities. End device 130 may be implemented as a mobile device, a portable device, a stationary device (e.g., a non-mobile device and/or a non-portable device), a device operated by a user, or a device not operated by a user. For example, end device 130 may be implemented as a smartphone, a mobile phone, a personal digital assistant, a tablet, a netbook, a phablet, a wearable device (e.g., a watch, glasses, etc.), a computer, a gaming device, a music device, an IoT device, a drone, a smart device, a fixed wireless device, a router, a sensor, an automated guided vehicle (AGV), an industrial robot, or other type of wireless device (e.g., other type of UE). End device 130 may be configured to execute various types of software (e.g., applications, programs, etc.). The number and the types of software may vary among end devices 130. End device 130 may include "edge-aware" and/or "edge-unaware" application service clients. For purposes of description, end device 130 is not considered a network device. End device 130 may include a DS-TT.

Figure 2A:
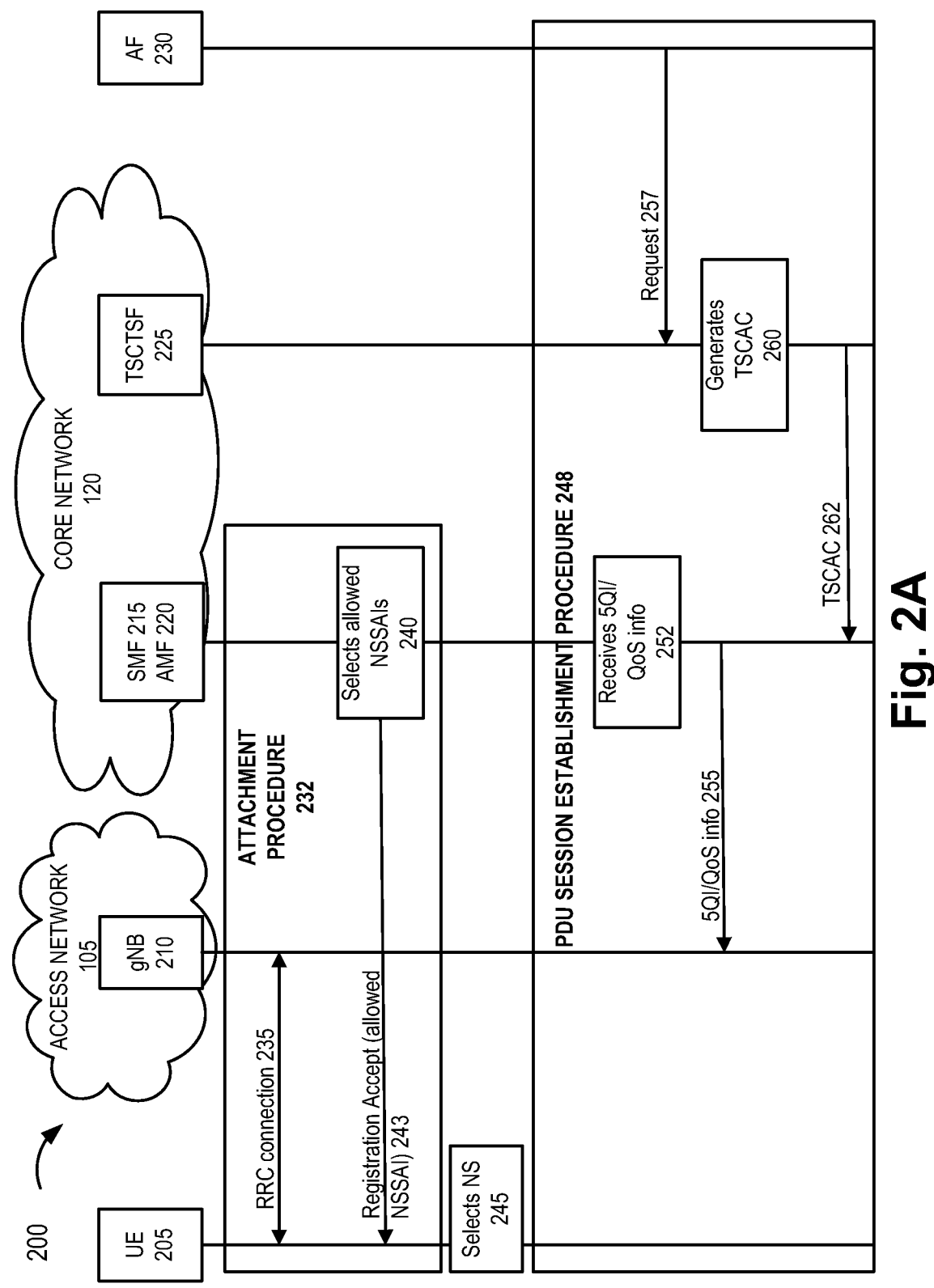
FIGS. 2A and 2B are diagrams illustrating an exemplary process of an exemplary embodiment of the propagation delay compensation service.
Figure 2B:
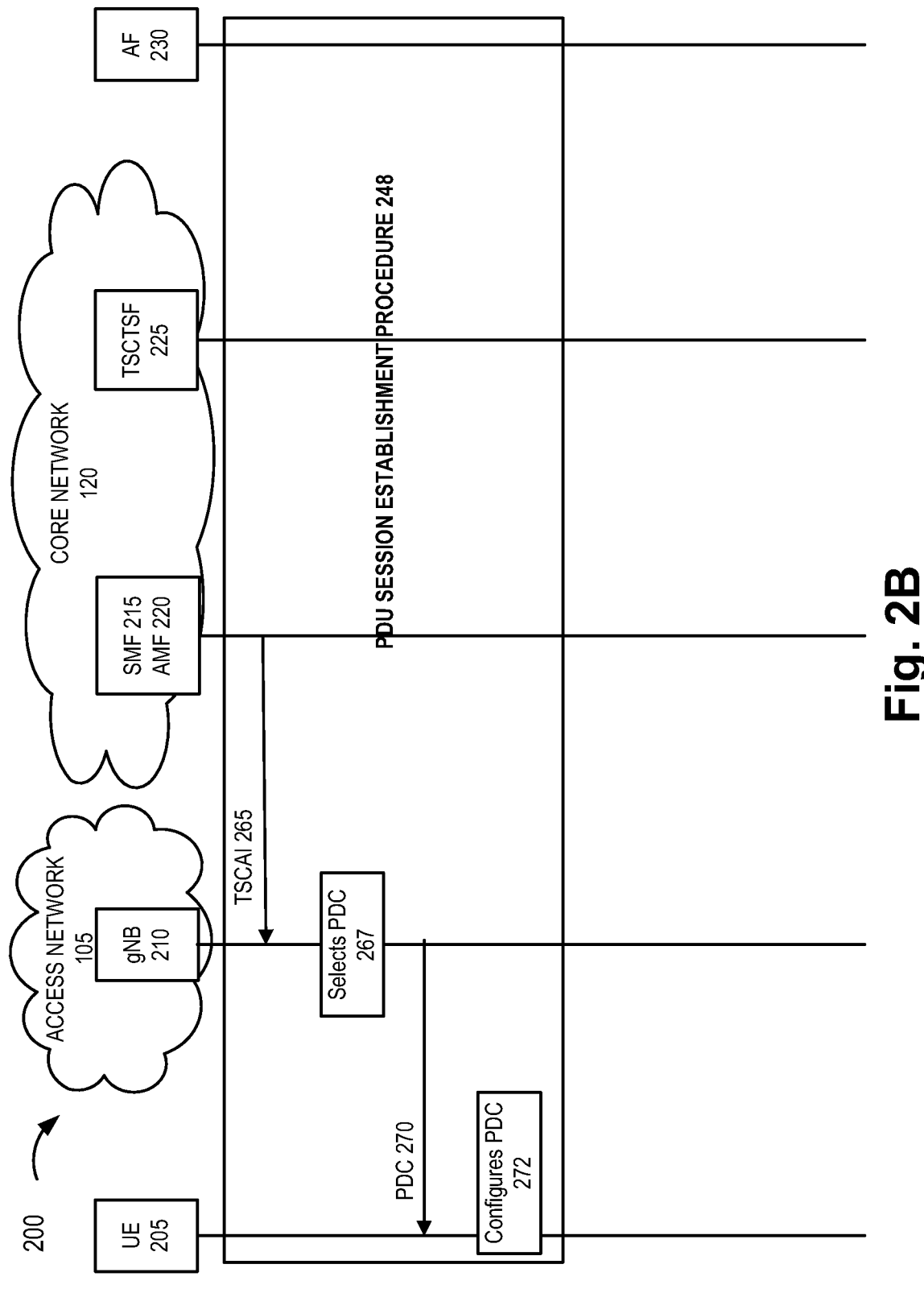

FIGS. 2A and 2B are diagrams illustrating an exemplary process 200 of an exemplary embodiment of the propagation delay compensation service according to an exemplary scenario. As illustrated, process 200 may be implemented in an environment that includes access device 107, such as gNB 210 and core devices 122, such as an SMF 215, an AMF 220, and a TSCTSF 225. As described in relation to FIG. 1, according to other exemplary embodiments, the environment may include other types of core devices 122 and access device 107, not specifically illustrated and described in FIGS. 2A and 2B. As further illustrated, process 200 may be implemented in an environment that includes external device 117, such as an AF 230. A UE 205 is an implementation of end device 130.

gNB 210 may provide a function and/or a service in accordance with a network standard (e.g., 3GPP, 3GPP2, ITU, ETSI, GSMA, and/or the like) and/or of a proprietary nature. For example, gNB 210 may provide packet processing, baseband processing, radio signal processing, radio resource control, mobility control, session management, and allows end device 130 to connect to core network 120 via an air interface, among other functions.

Additionally, for example, gNB 210 may include logic of an exemplary embodiment of the propagation delay compensation service, as described herein. For example, gNB 210 may select a propagation delay compensation method (e.g., TA or Multi-RTT) and configuration based on TSCAI, 5QI and correlated QOS characteristics/information, as described herein. gNB 210 may select the propagation delay compensation method and configuration based on other types of information, such as S-NSSAI, UE Power Class, access barring information, and/or other types of criteria information, as described herein.

According to other exemplary embodiments of the environment, gNB 210 may be implemented according to a functional split architecture in which a split device may provide a portion or all of the propagation delay compensation service, as described herein. For example, a CU, a DU, or a combination of the CU and the DU may provide the propagation delay compensation service. Alternatively, a CU/DU/RU split may be implemented, for example.

SMF 215, AMF 220, and TSCTSF 225 may each provide a function and/or a service in accordance with a network standard (e.g., 3GPP, 3GPP2, ITU, ETSI, GSMA, and/or the like) and/or of a proprietary nature. For example, SMF 215 may provide session management, Internet Protocol (IP) address allocation and management, selection, and control of user plane (UP) function, configuration of traffic steering, control of policy enforcement and QoS, among other functions. AMF 220 may provide registration, connection, reachability, and mobility management, security context management, location service management, UE mobility event notification, among other functions. TSCTSF 225 may expose a 5GS and/or end device availability and capabilities for synchronization service to AF 230, determine the PTP functionalities supported by DS-TT and NW-TT, and may configure PTP instances using port and user plane node management information, among other functions.

Additionally, for example, SMF 215 and TSCTSF 225 may each include logic of an exemplary embodiment of the propagation delay compensation service, which may be slice specific, as described herein. For example, SMF 215 may provide 5QI/QoS information and the TSCAI, which may include the time synchronization error budget, to an RAN device, such as gNB 210. TSCTSF 225 may generate the time synchronization error budget based on a 5QI/QoS information associated with a network slice (e.g., S-NSSAI). TSCTSF 225 may generate the time synchronization error budget based on other information, such as a time synchronization error budget provided by an AF 230 (directly or via a NEF), whether a 5GS or a clock connected to DS-TT/NW-TT acts as the grandmaster clock, PTP port states, and so forth. TSCTSF 225 may provide TSCAI, which may include the time synchronization error budget, to SMF 215, for example.

AF 230 may provide an end device application service. AF 230 may be implemented as a third party network device, for example, such as an application server. AF 230 may include logic of an exemplary embodiment of the propagation delay compensation service, as described herein.

Referring to FIG. 2A, according to an exemplary scenario, assume that UE 205 initiates an attachment procedure 232. For example, attachment procedure 232 may include establishing a radio resource control (RRC) connection 235 with gNB 210. Additionally, attachment procedure 232 may include authentication and registration procedures with core network 120. Although not illustrated, the authentication procedure may include AMF 220 as well as involve other core devices 122 (not shown), such as an AUSF, a UDM, etc. AMF 220 may also participate in the initial registration of UE 205 with core network 120 based on an end device identifier of UE 205. As a part of the registration procedure, UE 205 may transmit a registration request, which may include a request for NSSAI (not illustrated). In response, according to this exemplary scenario, in response to receiving the registration request, AMF 220 may select allowed NSSAI 240 for UE 205. AMF 220 may generate and transmit a registration accept 243, which may include allowed NSSAI, to UE 205.

According to the exemplary scenario, in response to or thereafter (e.g., a user may launch an application on UE 205), UE 205 may select a network slice 245 based on the allowed NSSAI. UE 205 may initiate a PDU session establishment procedure 248. According to this exemplary scenario, UE 205 may wish to establish a PDU session with AF 230. Although not illustrated, PDU session establishment procedure 248 may include SMF selection, PCF selection, UPF selection, among other operations. For example, SMF 215 may select a PCF and initiate an SM policy association with the PCF. SMF 215 may receive 252 5QI/QoS information, which may pertain to the network slice/DNN, from a PCF. For example, the 5QI/QoS information may include a 5QI value, data indicating a resource type (e.g., delay-critical GBR, etc.), a default priority value, a packet delay budget value, a packet error rate value, a default maximum data burst volume value, and a default averaging window value. SMF 215 may provide the 5QI/QoS info 255 to gNB 210.

As further illustrated, AF 230 may generate and transmit a request 257 to TSCTSF 225. Request 257 may relate to 5GS and/or UE availability and capabilities for time synchronization. Request 257 may include the DNN, the S-NS-SAI, and/or 5QI/QoS information associated with UE 205 and the prospective PDU session via the selected network slice. Request 257 may include TSCAI. For example, the TSCAI may include data indicating a direction (e.g., uplink and/or downlink) of the flow (e.g., TSC flow), periodicity data (e.g., a time period between a start of two data bursts), and optionally, burst arrival time data (e.g., a latest possible time when a first packet of a data burst arrives at an ingress of the RAN (e.g., downlink flow direction) or an ingress of the end device (e.g., uplink flow direction), and/or survival time data (e.g., a time period an application can survive without any data burst). According to some exemplary implementations, request 257 may include a time synchronization error budget.

TSCTSF 225 may generate 260 a TSCAC. For example, TSCTSF 225 may generate or calculate a time synchronization error budget (e.g., Uu time synchronization error budget) based on a 5QI (and potentially one or more instances of correlated QoS information with a 5QI value) associated with a network slice (e.g., S-NSSAI) and UE 205. For example, TSCTSF 225 may store a database, a data structure, or another type of information repository that may correlate the 5QI value and one or more QoS data values to a time synchronization error budget value or range of values (e.g., time values). TSCTSF 225 may perform a lookup in the information repository as a part of generating or calculating the time synchronization error budget. TSCTSF 225 may generate or calculate the time synchronization error budget based on other information, such as the TSCAI, the DNN, the S-NSSAI, a time synchronization error budget provided by an AF (directly or via a NEF), whether a 5GS or a clock connected to DS-TT/NW-TT acts as the grandmaster clock, PTP port states, and core network 120 and device parts of the time synchronization error budget. For example, the information repository may include one or more instances of the other information, which may be also correlated.

TSCTSF 225 may transmit 262 the TSCAC to SMF 215. For example, the TSCAC may include the time synchronization error budget and the TSCAI.

Referring to FIG. 2B, SMF 215 may transmit 265 TSCAI to gNB 210. For example, SMF 215 may transmit one or more instances of the TSCAI and the time synchronization error budget. For example, the one or more instances of the TSCAI may include the survival time data and/or other data instances of the TSCAI.

gNB 210 may select 267 a PDC and PDC configuration. For example, gNB 210 may select the PDC and PDC configuration based on the received (slice-specific) TSCAI, the time synchronization error budget, and the 5QI/QoS information. For example, gNB 210 may store a database, a data structure, or another type of information repository that may correlate the 5QI value, one or more QoS data values, and the time synchronization error budget to a PDC method (e.g., TA or Multi-RTT) and PDC configuration data (e.g., parameter(s) and parameter value(s)). gNB 210 may perform a lookup in the information repository as a part of the selection of the PDC and PDC configuration. gNB 210 may select the PDC and PDC configuration based on other information, such as the TSCAI. For example, the information repository may include one or more instances of the other information, which may be also correlated. For example, the information repository may correlate a QoS parameter (e.g., maximum data burst volume and/or other QoS data associated with the 5QI value) and a QoS parameter value to the PDC method and the PDC configuration data.

Additionally, or alternatively, for example, gNB 210 may determine a slot format for the traffic based on an S-NSSAI associated with the network slice, a UE Power Class value associated with UE 205, and access barring information associated with a cell or gNB 210 and applicable to UE 205. The UE Power Class of UE 205 may indicate a class for UE 205 (e.g., class 1, class 2, class 3, class 4), which relates to a maximum transmit power. gNB 210 may select the PDC and PDC configuration based on this information. For example, the information repository may correlate one or more instances of this information to the PDC method and the PDC configuration data.

According to an exemplary embodiment, gNB 210 may select the PDC method and the PDC configuration, as described herein, based on diverse types of criteria information (e.g., UE group/identity, part of day, congestion level in the RAN or at access device 107, a particular TSN slice, a particular application service, etc.). For example, gNB 210 may evaluate one or more instances of the criteria information relative to the current context associated with UE 205, the network slice, and the PDU session establishment. As an example, gNB 210 may determine whether the network slice is the TSN slice based on S-NSSAI of the network slice and/or may compare a current and/or a prospective congestion level to a threshold value.

gNB 210 may generate and transmit 270 the PDC and PDC configuration to UE 205. For example, gNB 210 may generate and transmit a message that includes the PDC and the PDC configuration relating to the network slice.

UE 205 may configure 272 the PDC. For example, UE 205 may configure the PDC method in accordance with the PDC configuration data associated with the selected network slice. Thereafter, although not shown, UE 205 may perform a PDC procedure based on the configuration and signaling information received from gNB 210.

The messages illustrated and described are exemplary. According to other exemplary embodiments, process 200 may include additional and/or different messages not specifically described and illustrated. According to other exemplary embodiments and scenarios, process 200 may include additional operations, fewer operations, and/or different operations that may be performed. For example, one or more operations of process 200 may be performed after the PDU session is established.

Figure 3:
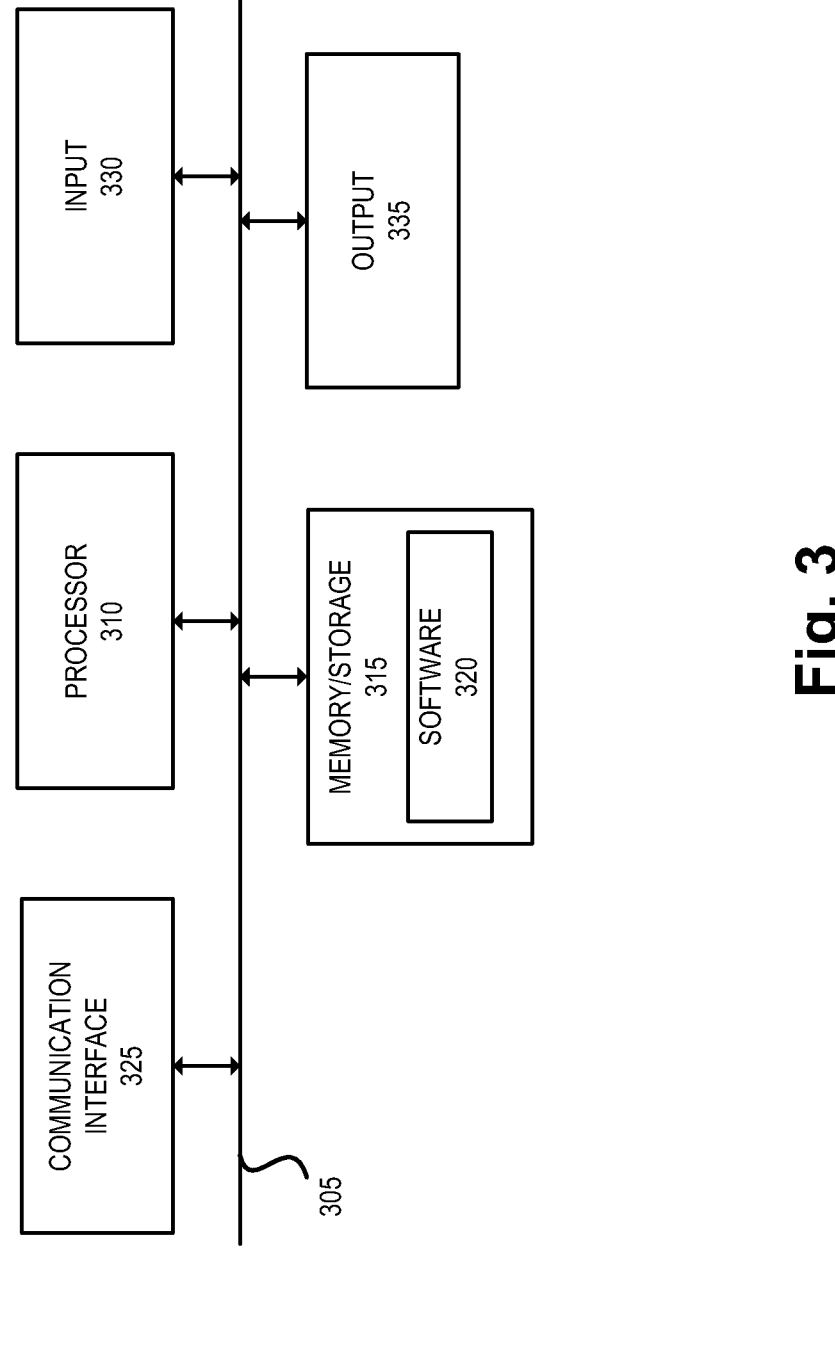
FIG. 3 is a diagram illustrating exemplary components of a device that may correspond to one or more of the devices illustrated and described herein.

FIG. 3 is a diagram illustrating exemplary components of a device 300 that may be included in one or more of the devices described herein. For example, device 300 may correspond to access device 107, external device 117, core device 122, end device 130, UE 205, gNB 210, SMF 215, AMF 220, TSCTSF 225, AF 230, and/or other types of devices, as described herein. As illustrated in FIG. 3, device 300 includes a bus 305, a processor 310, a memory/storage 315 that stores software 320, a communication interface 325, an input 330, and an output 335. According to other embodiments, device 300 may include fewer components, additional components, different components, and/or a different arrangement of components than those illustrated in FIG. 3 and described herein.

Bus 305 includes a path that permits communication among the components of device 300. For example, bus 305 may include a system bus, an address bus, a data bus, and/or a control bus. Bus 305 may also include bus drivers, bus arbiters, bus interfaces, clocks, and so forth.

Processor 310 includes one or multiple processors, micro-processors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 310 may be implemented as hardware (e.g., a microprocessor, etc.), a combination of hardware and software (e.g., a SoC, an ASIC, etc.), may include one or multiple memories (e.g., cache, etc.), etc.

Processor 310 may control the overall operation, or a portion of operation(s) performed by device 300. Processor 310 may perform one or multiple operations based on an operating system and/or various applications or computer programs (e.g., software 320). Processor 310 may access instructions from memory/storage 315, from other components of device 300, and/or from a source external to device 300 (e.g., a network, another device, etc.). Processor 310 may perform an operation and/or a process based on various techniques including, for example, multithreading, parallel processing, pipelining, interleaving, learning, model-based, etc.

Memory/storage 315 includes one or multiple memories and/or one or multiple other types of storage mediums. For example, memory/storage 315 may include one or multiple types of memories, such as, a random access memory (RAM), a dynamic RAM (DRAM), a static RAM (SRAM), a cache, a read only memory (ROM), a programmable ROM (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 315 may include a hard disk (e.g., a magnetic disk, an optical disk, a magneto-optic disk, a solid-state component, etc.), a Micro-Electromechanical System (MEMS)-based storage medium, and/or a nanotechnology-based storage medium.

Memory/storage 315 may be external to and/or removable from device 300, such as, for example, a Universal Serial Bus (USB) memory stick, a dongle, a hard disk, mass storage, off-line storage, or some other type of storing medium. Memory/storage 315 may store data, software, and/or instructions related to the operation of device 300.

Software 320 includes an application or a program that provides a function and/or a process. As an example, with reference to gNB 210, software 320 may include an application that, when executed by processor 310, provides a function and/or a process of propagation delay compensation service, as described herein. Additionally, for example, with reference to SMF 215 and TSCTSF 225, software 320 may include an application that, when executed by processor 310, provides a function and/or a process of propagation delay compensation service, as described herein. Software 320 may also include firmware, middleware, microcode, hardware description language (HDL), and/or other form of instruction. Software 320 may also be virtualized. Software 320 may further include an operating system (OS) (e.g., Windows, Linux, Android, proprietary, etc.).

Communication interface 325 permits device 300 to communicate with other devices, networks, systems, and/or the like. Communication interface 325 includes one or multiple wireless interfaces, optical interfaces, and/or wired inter-faces. For example, communication interface 325 may include one or multiple transmitters and receivers, or transceivers. Communication interface 325 may operate according to a protocol stack and a communication standard.

Input 330 permits an input into device 300. For example, input 330 may include a keyboard, a mouse, a display, a touchscreen, a touchless screen, a button, a switch, an input port, a joystick, speech recognition logic, and/or some other type of visual, auditory, tactile, affective, olfactory, etc., input component. Output 335 permits an output from device 300. For example, output 335 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, PaaS, etc.). Device 300 may be implemented in the same manner. For example, device 300 may be instantiated, created, deleted, or some other operational state during its life-cycle (e.g., refreshed, paused, suspended, rebooting, or another type of state or status), using well-known virtualization technologies. For example, access device 107, core device 122, external device 117, and/or another type of network device or end device 130, as described herein, may be a virtualized device.

Device 300 may perform a process and/or a function, as described herein, in response to processor 310 executing software 320 stored by memory/storage 315. By way of example, instructions may be read into memory/storage 315 from another memory/storage 315 (not shown) or read from another device (not shown) via communication interface 325. The instructions stored by memory/storage 315 cause processor 310 to perform a function or a process described herein. Alternatively, for example, according to other implementations, device 300 performs a function or a process described herein based on the execution of hardware (processor 310, etc.).

Figure 4:
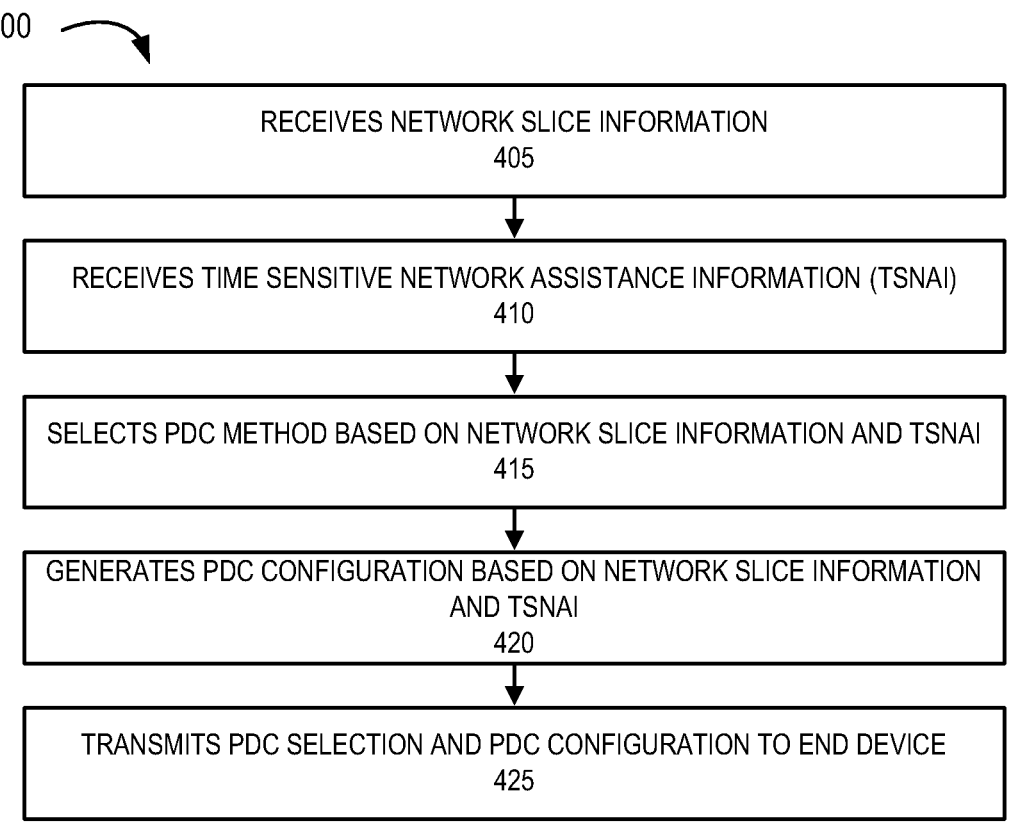
FIG. 4 is a flow diagram illustrating an exemplary process of an exemplary embodiment of the propagation delay compensation service.

FIG. 4 is a flow diagram illustrating yet another exemplary process 400 of an exemplary embodiment of the propagation delay compensation service. According to an exemplary embodiment, a gNB or similar functioning access device 107 may perform a step of process 400. According to an exemplary implementation, processor 310 executes software 320 to perform a step of process 400, as described herein. Alternatively, a step may be performed by execution of only hardware. For purposes of this description, process 400 is described as performed by the gNB, such as gNB 210. According to an exemplary embodiment, process 400 may be performed in whole or in part as a part of a PDU establishment procedure.

In block 405, gNB 210 may receive network slice information. For example, gNB 210 may receive 5QI/QoS values pertaining to a network slice from an SMF, such as SMF 215.

In block 410, gNB 210 may receive time sensitive network assistance information (TSNAI). For example, gNB 210 may receive one or more instances of the TSNAI, as described herein, from a TSCTSF (e.g., TSCTSF 225) or similar functioning core device 122. The TSNAI may include the time synchronization error budget, as described herein.

In block 415, gNB 210 may select a PDC method based on the network slice information and the TSNAI. For example, gNB 210 may select TA or RTT as the PDC method. According to an exemplary implementation, gNB 210 may perform a lookup that correlates network slice information values and TSNAI values to a PDC method.

In block 420, gNB 210 may generate a PDC configuration for the selected PDC based on the network slice information and the TSNAI. For example, gNB 210 may perform a lookup that correlates network slice information values and TSNAI values to a PDC configuration and associated parameters and parameter values.

In block 425, gNB 210 may transmit data indicating the PDC method and associated configuration to end device 130.

FIG. 4 illustrates an exemplary process of the propagation delay compensation service, according to other exemplary embodiments, the propagation delay compensation service may perform additional operations, fewer operations, and/or different operations than those illustrated and described. For example, gNB 210 may select the PDC method and generate the PDC configuration based on other types of information, such as UE Power Class type, S-NSSAI, access barring information, and other criteria information, as described herein.

Figure 5:
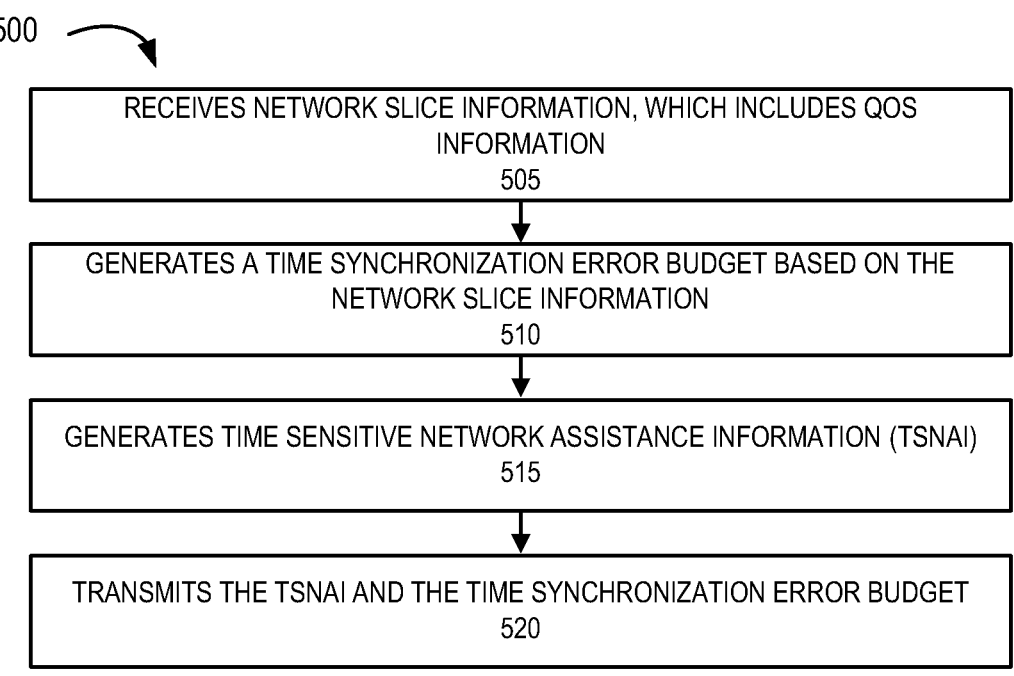
FIG. 5 is a flow diagram illustrating another exemplary process of an exemplary embodiment of the propagation delay compensation service.

FIG. 5 is a flow diagram illustrating yet another exemplary process 500 of an exemplary embodiment of the propagation delay compensation service. According to an exemplary embodiment, a TSCTSF or similar functioning core device 122 may perform a step of process 500. According to an exemplary implementation, processor 310 executes software 320 to perform a step of process 500, as described herein. Alternatively, a step may be performed by execution of only hardware. For purposes of this description, process 500 is described as performed by the TSCTSF, such as TSCTSF 225. According to an exemplary embodiment, process 500 may be performed in whole or in part as a part of a PDU establishment procedure.

In block 505, TSCTSF 225 may receive network slice information, which includes QoS information. For example, TSCTSF 225 may receive 5QI and correlated QoS information associated with NSSAI of a network slice from an AF, such as AF 230.

In block 510, TSCTSF 225 may generate a time synchronization error budget based on the network slice information. For example, TSCTSF 225 may generate the time synchronization error budget based on a 5QI value and correlated QoS information associated with NSSAI of a network slice, as described herein. According to exemplary implementation, TSCTSF 225 may perform a lookup that provides a correlated error budget value or range of error budget value relative to the network slice information, as described herein.

In block 515, TSCTSF 225 may generate time sensitive network assistance information. For example, the time sensitive network assistance information may include flow direction data, periodicity data, and optionally, burst arrival data and/or survival time data, as described herein.

In block 520, TSCTSF 225 may transmit the TSNAI and the time synchronization error budget to a RAN device. For example, TSCTSF 225 may transmit the TSNAI and the time synchronization error budget in a TSCAC to an SMF, such as SMF 215. According to some exemplary implementations, the TSCAC may include time domain data, as described herein.

FIG. 5 illustrates an exemplary process of the propagation delay compensation service, according to other exemplary embodiments, the propagation delay compensation service may perform additional operations, fewer operations, and/or different operations than those illustrated and described.

Figure 6:
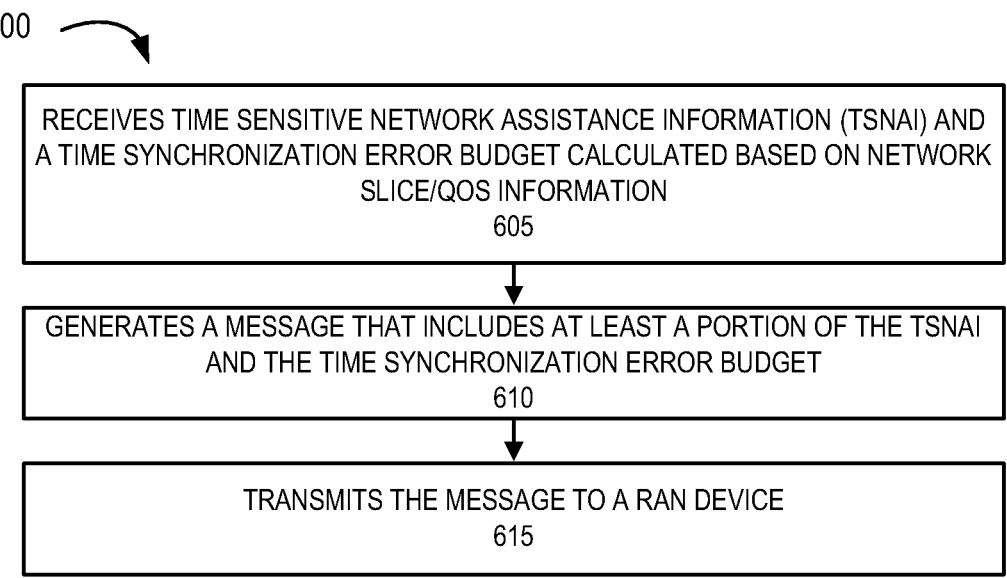
FIG. 6 is a flow diagram illustrating still another exemplary process of an exemplary embodiment of the propagation delay compensation service.

FIG. 6 is a flow diagram illustrating yet another exemplary process 600 of an exemplary embodiment of the propagation delay compensation service. According to an exemplary embodiment, an SMF or similar functioning core device 122 may perform a step of process 600. According to an exemplary implementation, processor 310 executes software 320 to perform a step of process 600, as described herein. Alternatively, a step may be performed by execution of only hardware. For purposes of this description, process 600 is described as performed by an SMF, such as SMF 215. According to an exemplary embodiment, process 600 may be performed in whole or in part as a part of a PDU establishment procedure.

In block 605, SMF 215 may receive time sensitive network assistance information (TSNAI) and a time synchronization error budget calculated based on network slice and associated QoS information. For example, SMF 215 may receive a TSCAC that includes TSNAI and the time synchronization error budget from a core device 122, such as a TSCTSF (e.g., TSCTSF 225), as described herein.

In block 610, SMF 215 may generate a message that includes at least a portion of the TSNAI and the time synchronization error budget. As an example, SMF 215 may include in the message the survival time and/or one or more other data instances of the TSNAI along with the time synchronization error budget.

In block 615, SMF 215 may transmit the message to a RAN device. For example, SMF 215 may transmit the message to a gNB (e.g., gNB 210).

FIG. 6 illustrates an exemplary process of the propagation delay compensation service, according to other exemplary embodiments, the propagation delay compensation service may perform additional operations, fewer operations, and/or different operations than those illustrated and described.

As set forth in this description and illustrated by the drawings, reference is made to "an exemplary embodiment," "exemplary embodiments," "an embodiment," "embodiments," etc., which may include a particular feature, structure, or characteristic in connection with an embodiment(s). However, the use of the phrase or term "an embodiment," "embodiments," etc., in various places in the description does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while a series of blocks have been described regarding the processes illustrated in FIGS. 4, 5, and 6, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 310, etc.), or a combination of hardware and software (e.g., software 320).

Embodiments have been described without reference to the specific software code because the software code can be designed to implement the embodiments based on the description herein and commercially available software design environments and/or languages. For example, diverse types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 310) of a device. A non-transitory storage medium includes one or more of the storage mediums described in relation to memory/storage 315. The non-transitory computer-readable storage medium may be implemented in a centralized, distributed, or logical division that may include a single physical memory device or multiple physical memory devices spread across one or multiple network devices.

To the extent the aforementioned embodiments collect, store, or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage, and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such. All structural and functional equivalents to the elements of the various aspects set forth in this disclosure that are known or later come to be known are expressly incorporated herein by reference and are intended to be encompassed by the claims.

What is claimed is:

1. A method comprising:
receiving, by one or more radio access network (RAN) devices, network slice information pertaining to a network slice;
receiving, by the one or more RAN devices, time sensitive network assistance information (TSNAI) that includes a time synchronization error budget calculated based on quality of service (QOS) information associated with the network slice;
selecting, by the one or more RAN devices, a propagation delay compensation method and a configuration based on the network slice information, the TSNAI, a User Equipment (UE) Power Class value of an end device, and access barring information pertaining to the end device; and
transmitting, by the one or more RAN devices, a message that includes data indicating the propagation delay compensation method and the configuration, to the end device.

2. The method of claim 1, wherein the QoS information is correlated to a Fifth Generation QoS identifier (5Q1) pertaining to the network slice.

3. The method of claim 1, wherein the selecting is further based on congestion information at the one or more RAN devices.

4. The method of claim 1, wherein the TSNAI includes a survival time value.

5. The method of claim 1, wherein the QoS information includes single network slice selection assistance information (S-NSSAI).

6. The method of claim 1, further comprising:
determining, by the one or more RAN devices, that the network slice is a TSN slice.

7. The method of claim 1, wherein the time synchronization error budget includes an error budget for the one or more RAN devices to provide access stratum time to the end device.

8. The method of claim 1, wherein the RAN devices are a next generation Node B.

9. One or more network devices comprising:
one or more processors that are configured to:
receive network slice information pertaining to a network slice, wherein the one or more network devices are a radio access network (RAN) device;
receive time sensitive network assistance information (TSNAI) that includes a time synchronization error budget calculated based on quality of service (QOS) information associated with the network slice;
select a propagation delay compensation method and a configuration based on the network slice information, the TSNAI, a User Equipment (UE) Power Class value of an end device, and access barring information pertaining to the end device; and
transmit a message that includes data indicating the propagation delay compensation method and the configuration, to an end device.

10. The one or more network devices of claim 9, wherein the QoS information is correlated to a Fifth Generation QoS identifier (5Q1) pertaining to the network slice.

11. The one or more network devices of claim 10, wherein the one or more processors are further configured to:

select the propagation delay compensation method and the configuration based on congestion information at the one or more network devices.

12. The one or more network devices of claim 9, wherein the TSNAI includes a survival time value.

13. The one or more network devices of claim 9, wherein the QoS information includes single network slice selection assistance information (S-NSSAI).

14. The one or more network devices of claim 9, wherein the one or more processors are further configured to:

determine that the network slice is a TSN slice.

15. The one or more network devices of claim 9, wherein the time synchronization error budget includes an error budget for the one or more network devices to provide access stratum time to the end device.

16. The one or more network devices of claim 9, wherein the RAN device is a next generation Node B.

17. A non-transitory computer-readable storage medium storing instructions executable by one or more processors of one or more network devices of a radio access network, wherein the instructions are configured to:

receive network slice information pertaining to a network slice;

receive time sensitive network assistance information (TSNAI) that includes a time synchronization error budget calculated based on quality of service (QOS) information associated with the network slice;

select a propagation delay compensation method and a configuration based on the network slice information, the TSNAI, a User Equipment (UE) Power Class value of an end device, and access barring information pertaining to the end device; and transmit a message that includes data indicating the propagation delay compensation method and the configuration, to the end device.

18. The non-transitory computer-readable storage medium of claim 17, wherein the QoS information is correlated to a Fifth Generation QoS identifier (5Q1) pertaining to the network slice.

19. The non-transitory computer-readable storage medium of claim 17, wherein the TSNAI includes a survival time value.

20. The non-transitory computer-readable storage medium of claim 17, wherein the time synchronization error budget includes an error budget for the one or more network devices to provide access stratum time to the end device.

* * * * *